United States Patent [19]
Huber

[11] Patent Number: 5,188,051
[45] Date of Patent: Feb. 23, 1993

[54] POWER STEERING MECHANISM FOR VEHICLES, PARTICULARLY MOTOR BOATS

[75] Inventor: Gerhard Huber, Frankenhofen, Fed. Rep. of Germany

[73] Assignee: Hoerbiger Hydraulik GmbH, Schongau, Fed. Rep. of Germany

[21] Appl. No.: 630,253

[22] Filed: Dec. 19, 1990

[30] Foreign Application Priority Data

Dec. 21, 1989 [AT] Austria ............... 2908/89

[51] Int. Cl.$^5$ ............................................ B63H 25/22
[52] U.S. Cl. .................................... 114/150; 440/61; 91/420
[58] Field of Search ............. 114/144 R, 150; 91/59, 91/509, 510, 420; 440/61; 92/134

[56] References Cited

U.S. PATENT DOCUMENTS 4,295,833 10/1981 Borst ........................................ 440/63
4,632,049 12/1986 Hall et al. ............................... 114/150

Primary Examiner—Jesús D. Sotelo
Attorney, Agent, or Firm—Watson, Cole, Grindle & Watson

[57] ABSTRACT

The power steering mechanism for vehicles, in particular motor boats, has a control wheel that is drive-connected to a control via cable that is attached thereto and a lever system connected thereto. The core of the cable is mechanically connected to the lever system whereas the sheath of the cable is attached to the displaceable control member of the control valve. The control valve controls a hydraulic operating cylinder whose power piston also acts on the lever system of the control. To simplify and reduce the size of the arrangement, the operating cylinder and the control valve are built directly together in axial direction, and the core of the cable penetrates the control member of the control valve and is connected to the power piston of the operating cylinder and in this manner is also connected to the lever system of the control.

13 Claims, 2 Drawing Sheets

POWER STEERING MECHANISM FOR VEHICLES, PARTICULARLY MOTOR BOATS

BACKGROUND OF THE INVENTION

The present invention relates to a power steering mechanism for vehicles, in particular motor boats, with a control wheel, a cable that is to be attached thereto having a core and a sheath, and a lever system which is connected to the core and is drive-connected to the control of the vehicle or motor boat. The sheath of the cable is braced at the control means wheel and is attached to an adjustable control member of a control valve, which controls a hydraulic operating cylinder, whose power piston also acts on the lever system.

A power steering mechanism of this kind disclosed in U.S. Pat. No. 4,295,833. The control wheel is connected via a swivel lever to the core of the cable whose sheath is clamped immovably in the region of the control wheel. At the other end, the core is connected to the lever system of the control, whereas the sheath of the cable is connected to the adjustable control member of the control valve. In this known design the cable acts on a private operating system for the control valve separated from it. The operating cylinder is also separated from the control valve. To connect the separated control systems, they must have their own pressure medium lines, which can be damaged and lead to stoppages. The cable and power piston require their own lever system. The known power steering mechanism is, therefore, expensive and bulky, and needs a relatively large space which is often not available, especially on motor boats.

A power steering mechanism of this kind is also known in which the control valve and the operating cylinder are built parallel to one another in a common housing, wherein the core of the cable pierces the control member of the control valve axially and is attached to an operating linkage for the control. In this manner a separate system to actuate the control valve can be dispensed with. For servo support by means of the operating cylinder, however, this known device needs its own operating linkage.

SUMMARY OF THE INVENTION

The present invention provides means for further improving and simplifying the known power steering mechanisms and, in particular, for reducing space requirements and for increasing reliability.

Problems in these areas are solved with the present invention by providing an operating cylinder which is arranged coaxially with the control valve in adjusting direction of the control member, and by connecting the power piston of the operating cylinder to the core of the cable that penetrates the control member in axial direction. The operating cylinder and the related control valve are no longer separated from one another and connected by exposed pipe lines. They are also not housed parallel to one another in a housing, but rather they lie one after the other in axial direction, whereby they can be directly coupled to one another. This use of space results in the power steering mechanism requiring a minimum of space so that it can be used without any problems on almost all motor boats. Since the cable and the operating cylinder act on the control system to be actuated by means of the same lever system, dispensing with the otherwise necessary additional lever system saves even more space. This reduction of a bulky lever system of the steering gear to almost half also leads, from a functional point of view, to a significant increase in reliability. Finally, exposed pressure medium lines between the control valve and the operating cylinder are also dispensed with.

According to the present invention, the control valve can be a hand lever valve with a valve piston, pierced in axial direction by the core of the cable, as the control member, which is connected to the sheath of the cable. The use of a hand lever valve enables a simple construction of the power steering mechanism, because it is quite suitable for building together with the operating cylinder in a arrangement in which they connect sequentially in the axial direction.

In a preferred embodiment of the invention, the control member of the control valve or its valve housing exhibits an axial extension, which pierces axially the operating cylinder and on which the power piston and the hollow piston rod are guided. The core of the cable is guided through the hollow extension and is connected to the piston rod of the power piston outside the operating cylinder and the extension. This design, too, yields a simple, space-economizing arrangement and good accessibility of individual components of the power steering mechanism. Only one single operating linkage is required for the mechanical connection of the operating cylinder and of the cable operated by the hand wheel with the control system of the vehicle or motor boat. According to such an arrangement, even if the servo support fails, a mechanical emergency actuation via the control wheel is possible.

Another advantageous variant of the present invention comprises having the core of the cable attached to a control body that can be moved axially in a power piston of the operating cylinder and can be displaced between two stops. The body controls at least one channel, which leads through the power piston from one cylinder chamber to the other, where the control member of the control valve can be moved in the draw direction of the sheath of the cable through said sheath against a force of a return spring. The control valve is designed in this case as two parts, where a separate control member is connected to the core and to the sheath of the cable. The control member can control, according to the invention, the connection between the cylinder chamber, which faces away from the piston rod of the power piston, and the tank of the hydraulic pressure medium, where the pressure medium is fed into the cylinder chamber pierced by the piston rod.

Another embodiment of the invention provides that the operating cylinder is designed as a differential cylinder, whose cylinder chamber pierced by the piston rod is permanently connected to the hydraulic pressure source, whereas the connection of the cylinder chamber facing away from the piston rod is controlled with the pressure source or the tank by means of the control valve. This design simplifies the control, because the cylinder chamber can be permanently supplied with pressure on the side of the piston rod by the pressure medium, whereby an otherwise necessary reversing of the pressure medium is superfluous. In addition, in contrast to the comparable known designs, no connection between the cylinder chambers on both sides of the piston is necessary.

It is also possible, within the framework of the invention, to control the cylinder sides separately by means of control engineering measures, regardless of whether a differential piston is provided or not. The control member of the control valve can be provided with at least one return spring, which holds it in a central position, in which the control channels leading to the operating cylinder are open, when the cable is relieved of its load.

The invention may be more fully understood with reference to the accompanying drawings and the following description of the embodiments shown in those drawings. The invention is not limited to the exemplary embodiments but should be recognized as contemplating all modifications within the skill of an ordinary artisan.

DETAILED DESCRIPTION OF PREFERRED EMBODIMENTS

Figure 1:
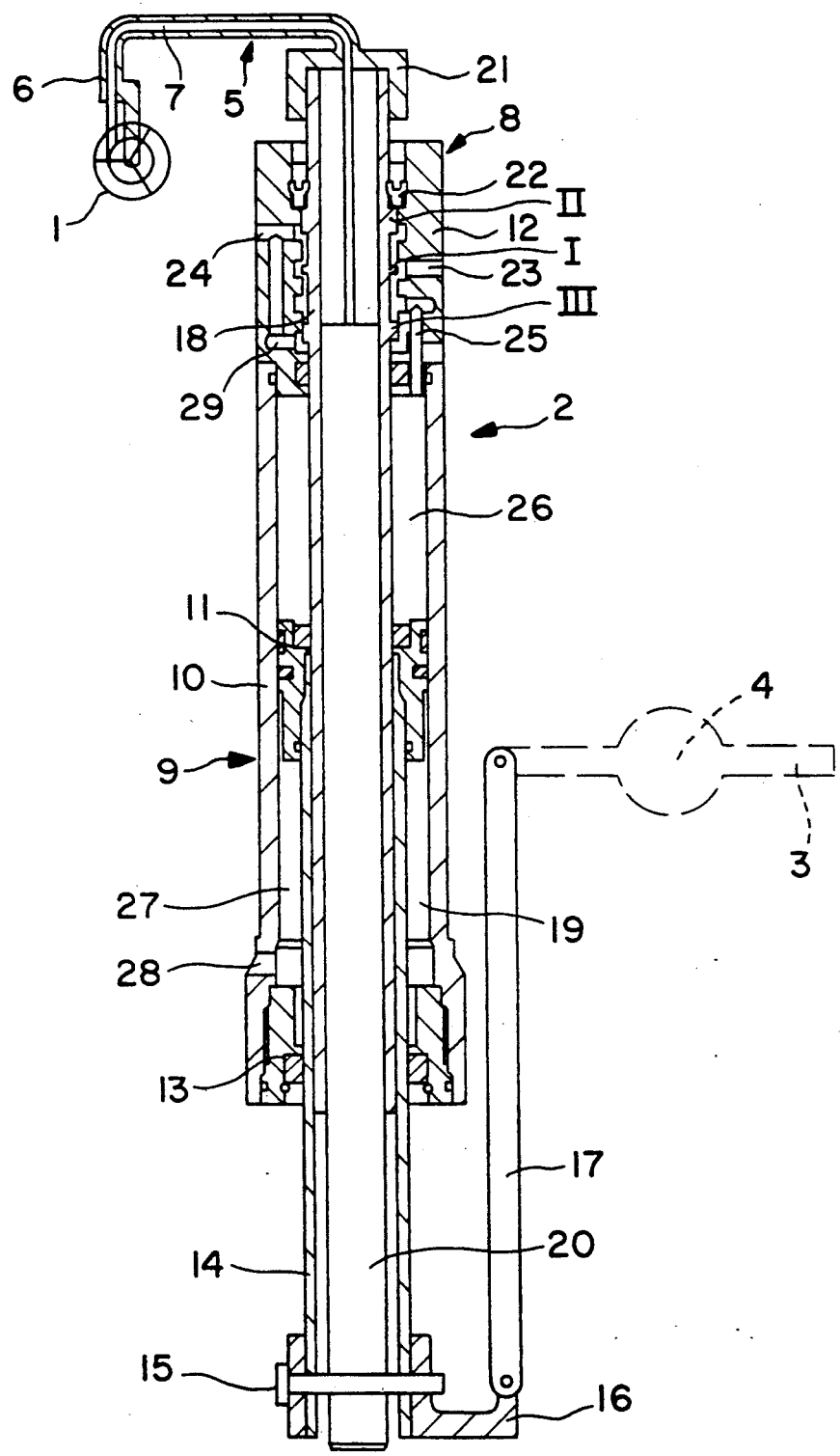
FIG. 1 is a schematic view of a power steering mechanism of the present invention, shown in part as a longitudinal sectional view.

The power steering mechanism, shown schematically in FIG. 1, comprises a control wheel 1, a subassembly 2 for the hydraulic steering support, and a control unit 3, e.g. a rudder of a motor boat or a Z-drive. The control unit 3 can also be the drive gear of a motor boat with a screw or another steering gear, e.g. a land vehicle. The control unit 3 can be swivelled around an axis 4 that is arranged stationarily in the boat body of the motor boat and that is indicated with a dashed-dotted line in the drawing. Control wheel 1 is also anchored stationarily to the boat body (not illustrated).

From control wheel 1, a cable 5, which comprises a sheath 6 and a core 7, leads to subassembly 2. The subassembly comprises substantially a control valve 8 and an operating cylinder 9 with a cylinder pipe 10 and a power piston 11. Cylinder pipe 10 is sealed on its end shown at the top in the drawing by a valve housing 12 of control valve 8. The bottom end of cylinder pipe 10 is closed by a cover 13 through which piston rod 14 of power piston 11 sealingly yet movably extends. By means of bolt 15, piston rod 14 is connected to lever 16, which is hinged to control unit 3 by means of linkage 17.

Control valve 8 housed in valve housing 12 is designed as a pusher with control member 18, which exhibits an axial extension 19. Extension 19 can be designed as one piece with control member 18; however, it can also form a separate part which is connected, e.g., screwed, to control member 18. As an alternative design, the extension 19 can also be provided at valve housing 12 of control valve 8 or be connected to it. Extension 19 pierces in axial direction operating cylinder 9 and is also hollow. Power piston 11 and the hollow piston rod 14 are guided sealingly on extension 19. Movably positioned within the hollow interior of extension 19 is a rod 20, which is attached at one end to core 7 of cable 5 and at its other end to piston rod 14 and likewise to lever 16 of operating linkage 17 by means of bolt 15. The result is a fixed mechanical connection, on the one hand, between control unit wheel 1 and control 3 via core 7 of cable 5, rod 20 and lever system 16, 17, and, on the other hand, between control unit 3 and operating cylinder 9, whose power piston 11 is also permanently connected to lever system 16, 17 by means of piston rod 14 and bolt 15.

Control member 18 of control valve 8 includes control portions I, II and III and is designed as a pusher. It is connected by means of a threaded nut 21 to sheath 6 of cable 5. Return spring 22 positions control member 18 at a center position relative to the valve housing 12 (as depicted in FIG. 1) when cable 5 is not stressed. Valve housing 12 has ports, i.e., a port 23 connected to a pressure medium pump and a port 24 leading to a tank. A channel 25 connects another control port to the cylinder chamber 26 on the side of the power piston 11 facing away from the piston rod 14. Cylinder chamber 27 is also connected to the pressure medium pump by means of a channel 28. Port 23 and channel 28, both of which are connected to the pressure medium pump, can also be connected internally, e.g., by means of a channel in cylinder pipe 10, which leads from port 23 into cylinder chamber 27 (not shown). Port 24 is connected to the tank. A channel 29 which extends is parallel with port 26 leads to another control port in the interior of valve housing 12.

The power steering mechanism described and illustrated works according to the principle of force balance. By actuating control wheel 1 a torque is exerted on control unit 3, not only by means of the existing mechanical connection, but also by, at the same time, controlling the medium supply to or from the desired cylinder chamber 26, 27 so that the steering force in the requisite direction is increased. Control valve 8 or control member 18 of the valve is operated by deforming cable 5. When, after control unit 3 has been displaced, the deformation of cable 5 ceases, control member 18 returns into its center position and closes the pressure medium feed to operating cylinder 9 so that control unit 3 remains standing in the desired position.

Cable 5 is operated as set forth below. When control wheel 1 is rotated counterclockwise to the left, core 7 of cable 5 is stressed, wherein a force is exerted by means of bolt 15 on power piston 11 in the direction "driven in" (towards the valve housing 12). Core 7 tries to assume a stretched position within sheath 6. Sheath 6 adapts to this stretched position, to the extent this is possible, thus displacing control member 18 in FIG. 1 downwardly into an end position. In this position port 23 remains connected to cylinder chamber 27 by means of channel 28 connected to the port (by means not shown), whereas cylinder chamber 26 is connected to the tank by means of channel 25, channel 29 and port 24. The connection between ports 23 and 24 is interrupted. The result is that the pressure medium flowing into cylinder chamber 27 also displaces power piston 11 in the "driven in" direction.

If, however, control wheel 1 is rotated to the right, sheath 6 of cable 5 displaces control member 18 against the force of return spring 22 into the upper end position in which both cylinder chambers 26 and 27 are connected to port 23 and thus to the pressure medium pump, whereas the connection to port 24, which leads to the tank, is interrupted. Since a larger effective area is supplied with pressure in cylinder chamber 26 than in cylinder chamber 27, the power piston 11 moves out (away from the valve housing 12), thus displacing control unit 3 in the other direction.

If, following displacement, there is no other steering movement, control member 18 moves into a position in which the force reacting from the control unit 3 is just balanced by the pressure applied at power piston 11 so that control unit 3 remains in the respective position until control wheel 1 is moved again.

Figure 2:
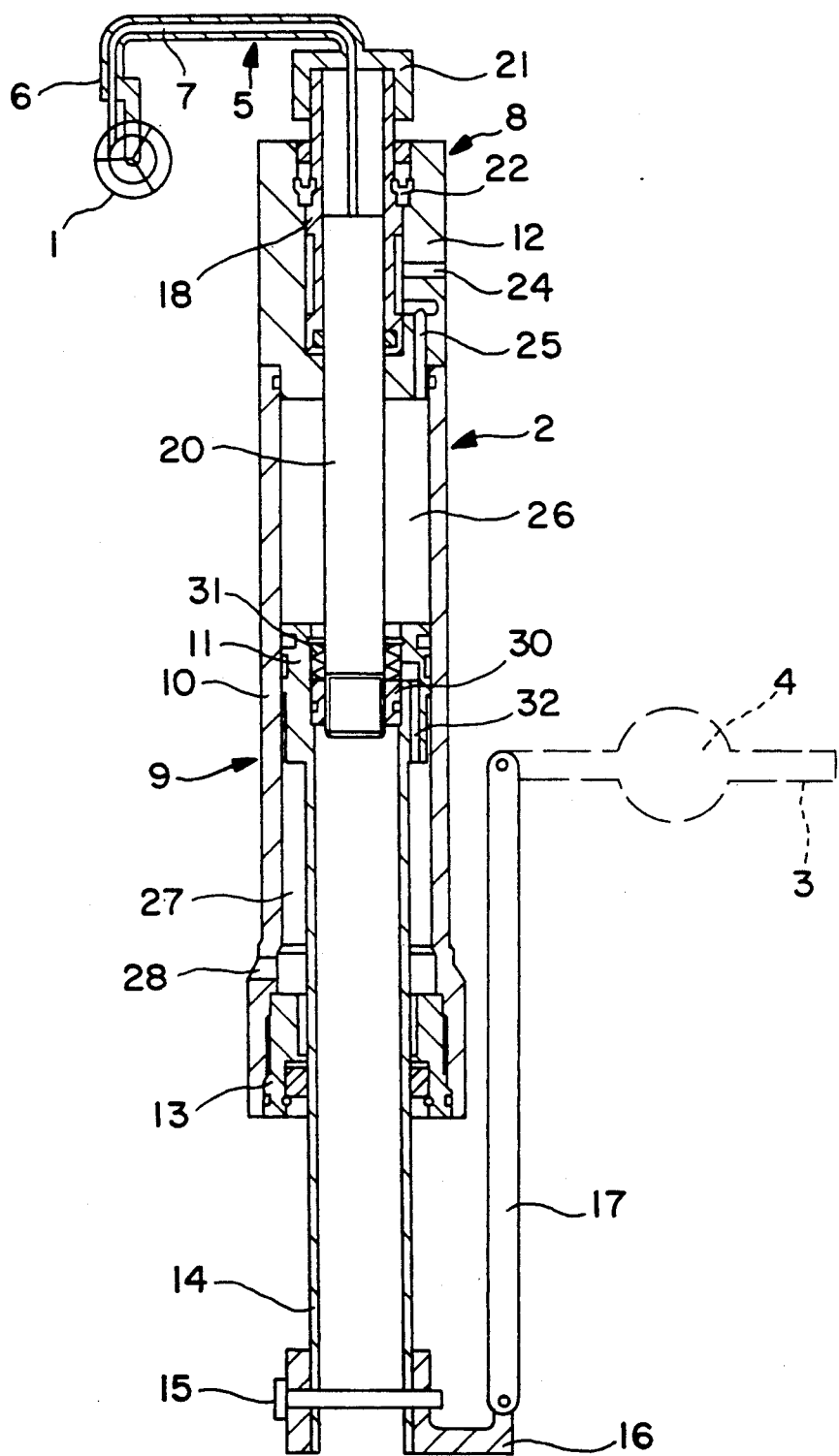
FIG. 2 is a longitudinal sectional view of a variant of the control valve and built-on operating cylinder.

The distinction between the embodiment of FIG. 2 and the embodiment of FIG. 1 lies in another design of control valve 8. In this embodiment, core 7 of cable 5 is attached to control body 30, which can be moved axially in power piston 11 of operating cylinder 9. Control body 30 is loaded by a return spring 31 and controls a channel 32, which leads through power piston 11 from cylinder chamber 26 to cylinder chamber 27. In the case of the embodiment of FIG. 1, control member 18, which is designed somewhat simpler, can be moved in valve housing 12. At its external end, sheath 6 of cable 5 is attached. However, here control member 18 controls only the connection of cylinder chamber 26 by means of channel 25 to port 24 leading to the tank. Cylinder chamber 27 is permanently connected to the pressure medium source by means of channel 28.

In this embodiment, if control wheel 1 is rotated to the left, core 7 of cable 5 pulls control body 30 against the force of return spring 31 towards the top and blocks channel 32, and thus the connection between the two cylinder chambers 26 and 27. However, cylinder chamber 26 continues to remain connected to the tank by means of channel 25. The pressure medium flowing in through channel 28 moves, therefore, power piston 11 in the "drive in" (towards the valve housing 12) direction. When rotating control wheel 1 to the right, control body 30 returns into the illustrated bottom end position and releases the connection between both cylinder chambers 26 and 27. In contrast, sheath 6 of the cable moves control member 18 against the force of return spring 22 towards the top, thus closing channel 25. In this manner an equivalent pressure is built up in both cylinder chambers 26, 27 by means of channel 28 and open channel 32 so that, owing to the larger effective piston area which is supplied with pressure in cylinder chamber 26, the power piston 11 is moved downwardly in the "drive out" direction.

Thus it is also possible with this simple and small device to move the control unit 3 (shown in FIG. 1) with servo support by operating control wheel 1. As in the embodiment of FIG. 1, the operating cylinder 9 with power piston 11 in the embodiment of FIG. 2 is also built on directly and coaxially to valve housing 12 of control valve 8, wherein core 7 of cable 5 penetrates coaxially control member 18, thus achieving an especially low space requirement.

What is claimed is:

1. A power steering mechanism for vehicles, in particular motor boats, with a control wheel, a cable which is attached thereto and has a core and a sheath, and a lever system which is connected to the core and is drive-connected to a control unit of the vehicle or motor boat, wherein the sheath of the cable is braced at one end thereof at the control wheel and is attached at an opposite end thereof to an adjustable control member of a control valve which controls a hydraulic operating cylinder whose power piston also acts on the lever system;

said operating cylinder being arranged coaxially with the control valve in adjusting direction of the control member and the power piston of the operating cylinder is connected to the cord of the cable that penetrates the control member in an axial direction.

2. A power steering mechanism as in claim 1, wherein the control valve is a hand lever valve, said control member comprising a valve piston pierced in an axial direction thereof by the core of the cable, said valve piston being connected to the sheath of the cable.

3. A power steering mechanism as in claim 1, wherein the control member of the control valve exhibits an axial hollow extension which extends axially within the operating cylinder and on which the power piston and a hollow piston rod are guided, wherein the core of the cable is guided through said hollow extension of said control member and is connected to the piston rod of the power piston outside the operating cylinder and the extension.

4. A power steering mechanism as in claim 1, wherein the core of the cable is attached to a control body that can be moved axially in a power piston of the operating cylinder and can be displaced between two stops and controls at least one channel which leads through the power piston from the cylinder chamber to another, cylinder chamber, the control member of the control valve being movable in the draw direction of the sheath of the cable through said sheath against a force of a return spring.

5. A power steering mechanism as in claim 4, wherein the control member controls the connection between the cylinder chamber which faces away from the piston rod of the power piston, and a tank of a hydraulic pressure medium, where the pressure medium is fed to the cylinder chamber penetrated by the piston rod.

6. A power steering mechanism as in claim 1, wherein the operating cylinder is designed as a differential cylinder whose cylinder chamber pierced by the piston rod is permanently connected to a hydraulic pressure medium, whereas the connection of the cylinder chamber facing away from the piston rod is controlled with the pressure medium by means of the control valve.

7. A power steering mechanism as in claim 1, wherein the control member of the control valve is provided with at least one return spring which holds it in a central position in which control channels leading to the operating cylinder are open when the cable is relieved of its load.

8. A power steering mechanism for turning a direction control means of a vehicle, said power steering mechanism comprising a steering wheel mounted on the vehicle, a lever assembly connected to the direction control means, a power steering subassembly and a steering cable extending from said steering wheel to said power steering subassembly, said steering cable including a core movably positioned within a sheath, said power steering subassembly including:

an elongated control valve and an operating cylinder coaxially connected to said control valve, said control valve including a valve housing having a port connectable to a pressure medium source and a port connectable to a tank, a control member which is movably positioned within said valve housing, a hollow axial extension which axially extends within said operating cylinder, and a control rod which is movably positioned within said hollow axial extension, a first end of said control member being connected to said cable sheath and a corresponding first end of said control rod being connected to said cable core, an opposite second end of said control rod being connected to said lever assembly; and said operating cylinder including a cylinder pipe which is connected at a first end to said valve housing, a cover which is positioned within a second end of said cylinder pipe, a power piston movably positioned within said cylinder pipe and along said axial extension, and a hollow piston rod which movably and sealingly extends through said cover and is connected at a first end to said power piston and at an opposite second end to said lever assembly, said power piston forming a first chamber between said operating cylinder, said axial extension, said power piston and said valve housing and a second chamber between said operating cylinder, said piston rod, said power piston and said cover, said cylinder pipe including a port for supplying pressure medium to said second cylinder chamber.

9. A power steering mechanism according to claim 8, including a spring means between said control member nd said valve housing to bias said control member into a center position within said valve housing.

10. A power steering mechanism according to claim 8, wherein said axial extension is connected to said control member.

11. A power steering mechanism for turning a direction control means of a vehicle, said power steering mechanism comprising a steering wheel mounted on the vehicle, a lever assembly connected to the direction control means, a power steering subassembly and a steering cable extending from said steering wheel to said power steering subassembly, said steering cable including a core movably positioned within a sheath, said power steering subassembly including:

an elongated control valve and an operating cylinder coaxially connected to said control valve, said control valve including a valve housing having a port connectable to a tank, a hollow control member which is movably positioned within said valve housing, a control rod having opposite first and second ends movably positioned within said hollow control member, said first end of said control rod being connected to said cable core and a corresponding first end of said control member being connected to said cable sheath, a control body connected to said second end of said control rod; and said operating cylinder including a cylinder pipe which is connected at a first end to said valve housing, a cover which is positioned within a second end of said cylinder pipe, a power piston movably positioned within said cylinder pipe and along said axial extension, and a hollow piston rod which extend through said cover and is connected at a first end to said power piston and at an opposite second end to said lever assembly, said power piston forming a first chamber between said cylinder pipe, said control rod, said power piston and said valve housing and a second chamber between said cylinder pipe, said piston rod, said power piston and said cover, said cylinder pipe including a port for supplying pressure medium to said second cylinder chamber.

12. A power steering mechanism according to claim 11, including a first return spring mounted between said power piston and said control body.

13. A power steering mechanism according to claim 11, including a second return spring mounted between said control member and said valve housing to bias said control member into a center position within said valve housing.

* * * * *